US008459797B2

(12) United States Patent
Kuo et al.

(10) Patent No.: US 8,459,797 B2
(45) Date of Patent: Jun. 11, 2013

(54) IMAGE VIEWING SYSTEMS WITH AN INTEGRATED SCREEN LENS

(75) Inventors: Huei Pei Kuo, Cupertino, CA (US); Alexandre M. Bratkovski, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 276 days.

(21) Appl. No.: 12/917,387

(22) Filed: Nov. 1, 2010

(65) Prior Publication Data
US 2012/0105806 A1 May 3, 2012

(51) Int. Cl.
*G03B 21/00* (2006.01)

(52) U.S. Cl.
USPC .......................................................... 353/7

(58) Field of Classification Search
USPC ............... 353/7, 8, 20, 78, 94, 98; 359/28, 359/443, 449, 458, 487.04, 599; 345/419
See application file for complete search history.

(56) References Cited

U.S. PATENT DOCUMENTS

| | | | | |
|---|---|---|---|---|
| 5,706,132 | A * | 1/1998 | Nestegard et al. | 359/529 |
| 6,877,857 | B2 * | 4/2005 | Perlin | 353/7 |
| 7,150,531 | B2 | 12/2006 | Toeppen | |
| 7,425,070 | B2 * | 9/2008 | Hsu | 353/7 |
| 7,450,188 | B2 * | 11/2008 | Schwerdtner | 349/15 |
| 7,699,472 | B2 | 4/2010 | Shestak | |
| 7,959,294 | B2 * | 6/2011 | Balogh | 353/7 |
| 2005/0007000 | A1 * | 1/2005 | Chou et al. | 313/116 |
| 2006/0291050 | A1 * | 12/2006 | Shestak et al. | 359/443 |
| 2008/0068372 | A1 * | 3/2008 | Krah | 345/419 |
| 2008/0259281 | A1 | 10/2008 | Odake et al. | |
| 2010/0253916 | A1 * | 10/2010 | Gao et al. | 353/7 |

FOREIGN PATENT DOCUMENTS

GB 2 405 543 A 3/2005

OTHER PUBLICATIONS

Son, Jung-Young et al., "Multi-viewing zone screen for multiview 3-D displays", Journal of the Optical Society of Korea, vol. 4, No. 1, Mar. 2000, pp. 62-65.

* cited by examiner

*Primary Examiner* — Thanh Luu
*Assistant Examiner* — Renee Naphas

(57) ABSTRACT

This disclosure is directed to rear projection and front projection image viewing systems. In one aspect, an image viewing system includes a screen composed of a lens and a reflective diffuser with a microstructured surface. The system also includes an array of projectors. Each projector is to project an image onto the screen with a particular angle of incidence such that each image is to pass through the lens and is to be reflected back though the lens by the reflective diffuser with a horizontal scattering angle determined by the microstructured surface. The lens is to direct each reflected image to a particular viewing area so that a viewer located in at least one viewing area receives a reflected image that enters one or both of the viewer's eyes when the viewer looks at the screen.

18 Claims, 12 Drawing Sheets

IMAGE VIEWING SYSTEMS WITH AN INTEGRATED SCREEN LENS

TECHNICAL FIELD

This disclosure relates to multiview and three-dimensional display technology.

BACKGROUND

In recent years, the advent of stereo display technologies enabling viewers to view objects in three-dimensions with two-dimensional displays has been gaining interest and acceptance. With typical stereo display technology, viewers are required to wear eye glasses that control the visual content delivered to each eye. However, it is typically the case that the relative orientations of the projections received by the viewer are correct only for certain viewing locations, such as locations where a viewer's view is orthogonal to the center of a display. By contrast, viewers watching the same display outside these viewing locations experience a re-projection error that manifests as a vertical misalignment of the visual content received by the eyes of the viewers. If the images are very different, then in some cases one image at a time may be seen, a phenomenon known as binocular rivalry. Another type of visual artifact in typical stereo display technologies is that foreground and background objects often appear with the same focus.

However, a typical three-dimensional display often yields distortions in images of three-dimensional structures when compared with the real scenes as a result of displaying three-dimensional images on a single two-dimensional surface. For example, focusing cues such as accommodation and blur in a retinal image specify the depth of the display rather than the depths objects in the images displayed. Moreover, typical three-dimensional displays produce three-dimensional images by uncoupling vengeance and accommodation, which often reduces a viewer's ability to effectively combine stereo image pairs and may cause viewer discomfort and fatigue. Thus, mere below threshold objectionableness may not be sufficient for permitting the presence of such artifacts.

Designers and manufacturers of three-dimensional display systems continue to seek systems and methods that reduce the adverse effects associated with typical stereo display technology.

DETAILED DESCRIPTION

This disclosure is directed to rear projection and front projection image viewing systems. The image viewing systems can be used to display multiple two-dimensional views of a scene or motion picture. Each two-dimensional view can be viewed from a different viewing area. The image viewing systems can also be used to create a perceived continuous three-dimensional viewing experience of a scene or motion picture with correct perspective views and without viewers having to wear glasses or goggles to control the image input to each eye.

Figure 1:
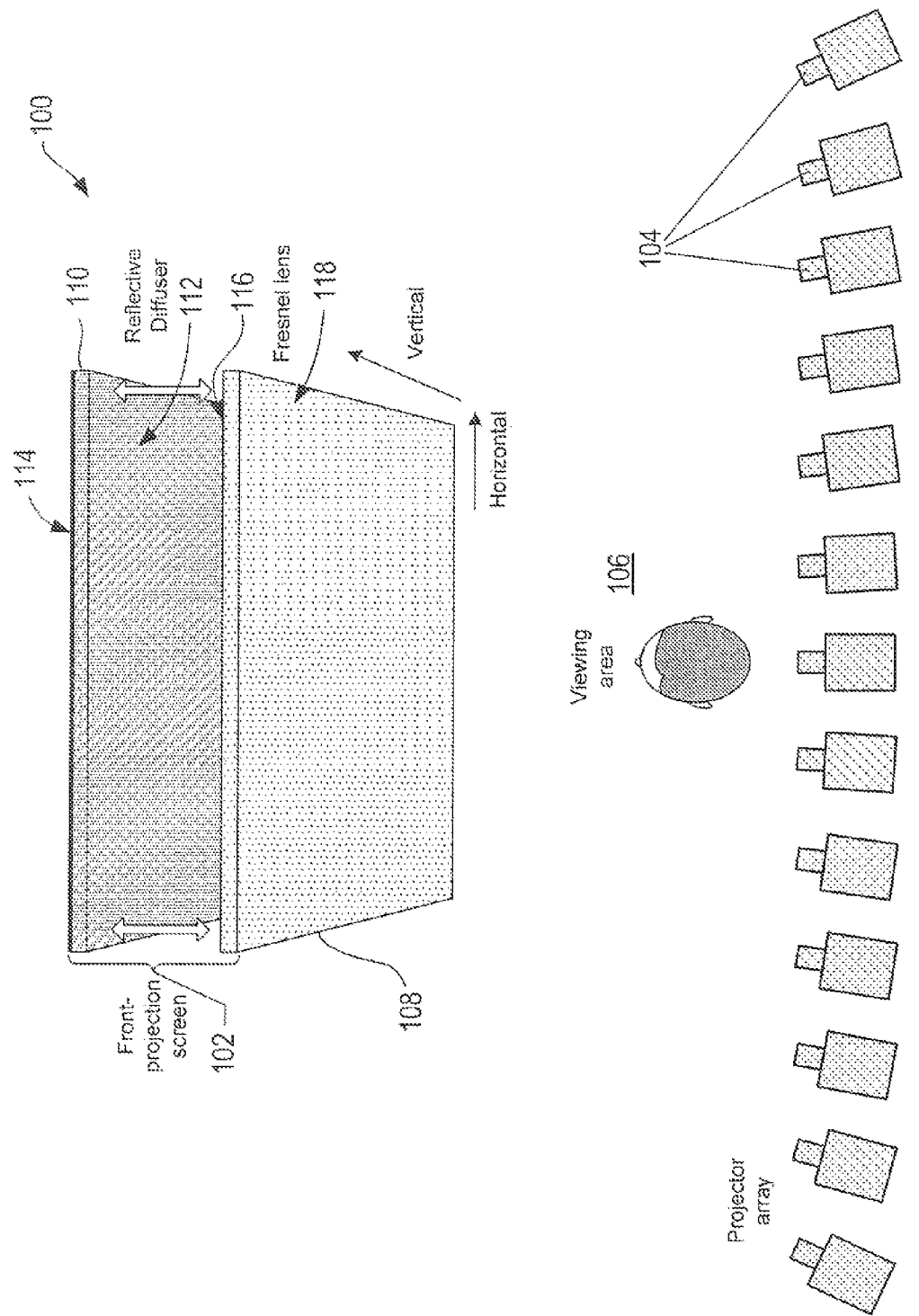
FIG. 1 shows a top perspective view, schematic representation of an example front projection image viewing system.

FIG. 1 shows a bird's-eye perspective view of an example front projection image viewing system 100. The system 100 includes a front projection screen 102 and an array of thirteen projectors 104 located behind a viewing area 106. The viewing area 106 can extend beyond the projectors, and the projectors 104 can be located in front of, above, or below, a viewers' eye level. Each projector 104 is positioned to project an image onto the screen 102. FIG. 1 shows an exploded isometric view of the screen 102. The screen 102 includes a flat lens 108, such as a Fresnel lens, and a reflective diffuser 110.

The diffuser 110 is composed of glass, polycarbonate, or another suitable transparent material and includes microstructures patterned in the surface 112 that faces the lens 108 and/or alternatively patterned in the surface 114 that faces away from the viewing area 106. The surface 114 is coated with a reflective material such as silver or aluminum. In another example, the microstructures are patterned on the surface 112 and the reflective material is deposited on the surface 114 away from the lens 108 and the viewing area 106. In other examples, the diffuser 110 can be composed of an opaque and highly reflective material, such as stainless steel with microstructures formed in the surface 112 that faces the lens 108. In another example, the microstructured surface 112 of the diffuser 110 can be coated with a thin reflective material, such as aluminum or silver. A protective coating can also be deposited over the reflective material. The scattering angles of light reflected off of the diffuser 110 are controlled by microstructures formed in the surfaces 112 and 114, as described in below with reference to FIG. 3.

The flat lens 108 can also be composed of glass, polycarbonate, or another suitable transparent material. The lens 108 can have cylindrical symmetry and operate as a circular lens or a cylindrical lens that focuses light in the horizontal direction, such as a Fresnel lens. In certain examples, the lens 108 surface 116 includes a series of parallel louvered grooves (not shown) in the vertical direction to form a convex cylindrical lens that focuses only in the horizontal direction. Alternatively, the lens 108 surface 116 can include a series of concentric annular louvered grooves (not shown) that enable the lens 106 to operate as a large convex lens. In certain examples, the grooves are formed in the surface 116 that faces the diffuser 110. In other examples, the grooves are formed in a surface 118 that faces the viewing area 106.

In the example of FIG. 1, the screen 102 is shown composed of two separate layers—the lens 108 and the diffuser 110. In still other examples, the screen can be composed of a single piece of transparent material, such as glass or polycarbonate, with a first surface that faces the viewing area 106 patterned to operate as a Fresnel lens and a second opposing surface patterned with microstructures and coated with a reflective material such as silver or aluminum. The thickness of the reflective material coatings can range from about 0.1 μm to about 1 μm.

Figure 2:
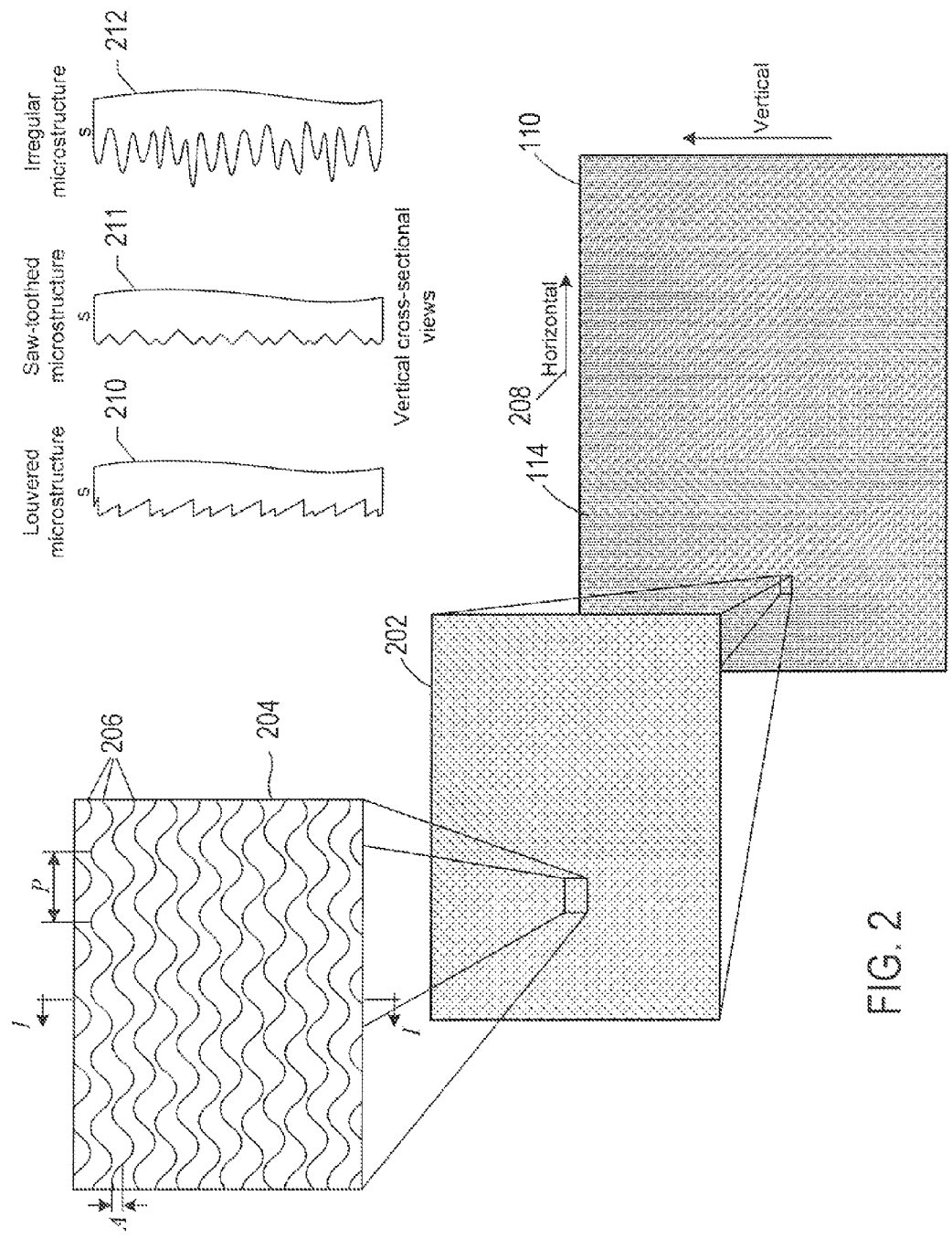
FIG. 2 shows a portion of an example microstructure surface magnified.

FIG. 2 shows an example of the microstructured surface 114 at two magnification levels in views 202 and 204. Magnified view 204 reveals an example of one kind of microstructures that can form the microstructured surface 114. In the example of FIG. 2, the microstructures are a series of vertically spaced grooves 206 that extend with a sinusoidal-like wave pattern in the horizontal direction 208. The parameter P represents the period or the distance in the horizontal direction of any point along a groove to the next point along the same groove of corresponding phase, and the parameter A represents the amplitude of the groove sinusoidal-like wave pattern, where the period P and amplitude A can vary along the length of the grooves. FIG. 2 also includes three example cross sections 210-212 of grooves along a line I-I shown in magnified view 204. For example, cross-sectional view 210 reveals a louvered groove shape. In other words, the grooves 206 can be slanted in cross sectional 210. Cross section 211 reveals saw-toothed or triangular-shaped grooves. Cross section 212 reveals an irregular cross-sectional pattern for the grooves.

Note that in the example magnified view 204, the grooves 206 are randomly distributed in the horizontal direction 208. In other examples, the grooves can also be arranged so that the troughs, or crests, of the grooves are aligned in the vertical direction 214. Alternatively, the grooves 206 can be arranged so that troughs along one groove are aligned with the crests along an adjacent groove.

Figure 3A:
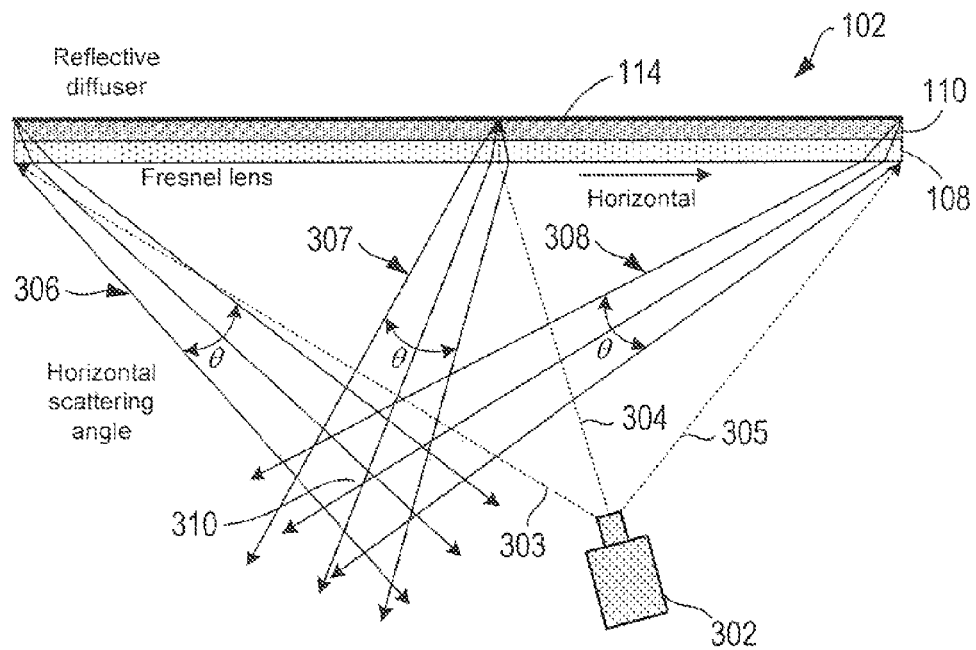
FIGS. 3A-3B show top and side views, respectively, of an example front projection screen and a projector of a front projection image viewing system.
Figure 3B:
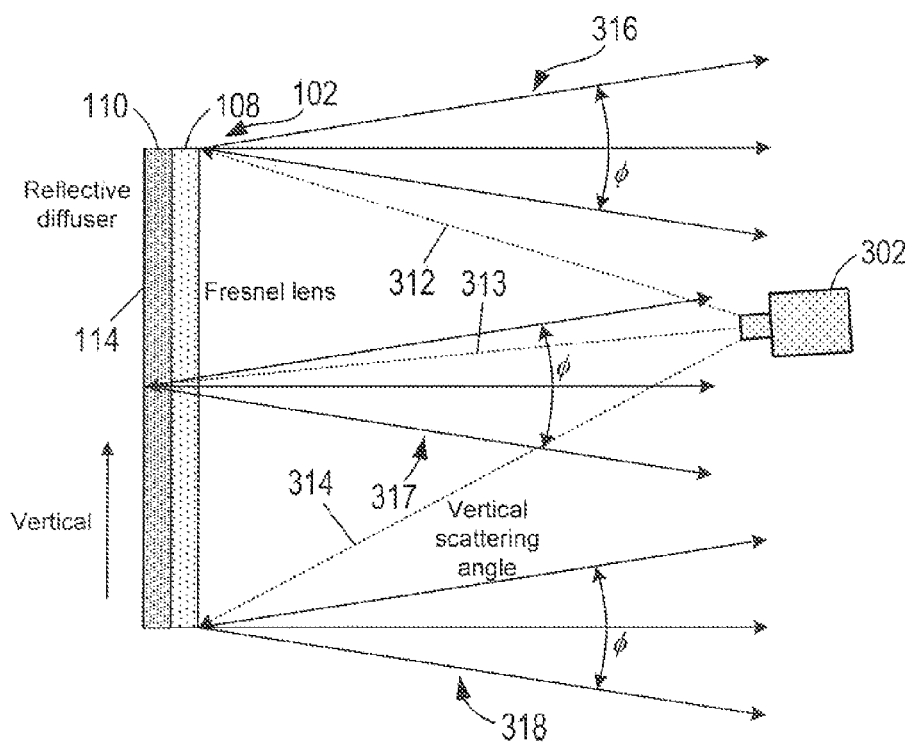

The horizontal scattering angle is controlled by the A/P ratio and the vertical scattering angle is controlled by the cross section of the grooves shown in FIGS. 210-212. FIGS. 3A-3B show top and side views, respectively, of the screen 102 and a projector 302. In FIGS. 3A-3B, the projector 302 projects light represented by incident rays 303-305 onto to the screen 102. The light is refracted upon entering the screen 102 by the lens 108, reflected from the microstructured surface 114, and is re-focused by the lens 108 to a viewing area 310. Rays 306-308 represent how light reflected off of the diffuser 110 is directed to the viewing area 310 by the lens 108 and scattered by the microstructured surface 114 with a horizontal scattering angle θ. The width of the viewing area 310 increases as the viewing distance from the screen 102 increases. In FIG. 3B, incident rays 312-314 are reflected by the diffuser 110 with a vertical scattering angle φ, as represented by reflected rays 316-318. The larger the horizontal scattering angle θ the more diffuse the reflected light appears in the horizontal direction 108. Likewise, the larger the vertical scattering angle φ the more diffuse the reflected light appears in the vertical direction 110. The vertical and horizontal scattering angles are independent. The vertical scattering angle φ can be greater than about 40°. In another example, the horizontal and vertical scattering angles are controlled by holographic microstructure patterns formed in the microstructured layers of the diffuser 110

Figure 4A:
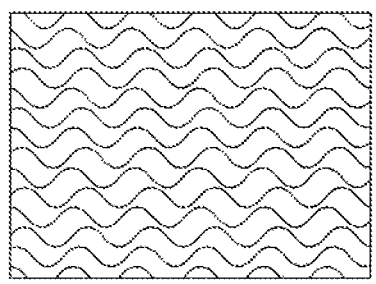
FIGS. 4A-4D show four example microstructure groove patterns at the same magnification.
Figure 4B:
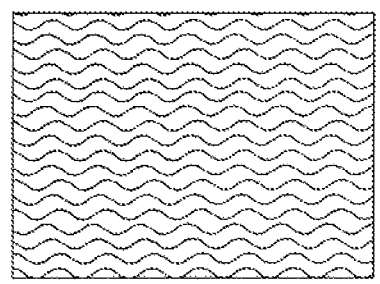
Figure 4C:
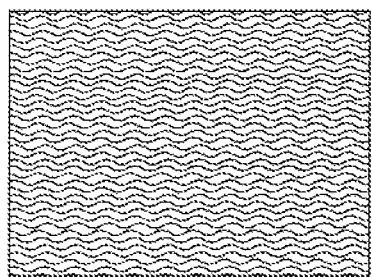
Figure 4D:
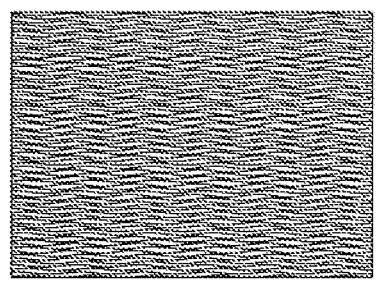

FIGS. 4A-4D show four examples of groove patterns for four example microstructured surfaces at the same magnification. The period P and amplitude A decrease from the groove pattern shown in FIG. 4A to the groove pattern shown in FIG. 4D. In other words, the example groove pattern shown in FIG. 4A has the largest period and amplitude, while the groove pattern shown in FIG. 4D is composed of nearly linear grooves. The periods and amplitudes associated with the groove patterns in FIGS. 4B and 4C are intermediate to those shown in FIGS. 4A and 4D.

Figure 5:
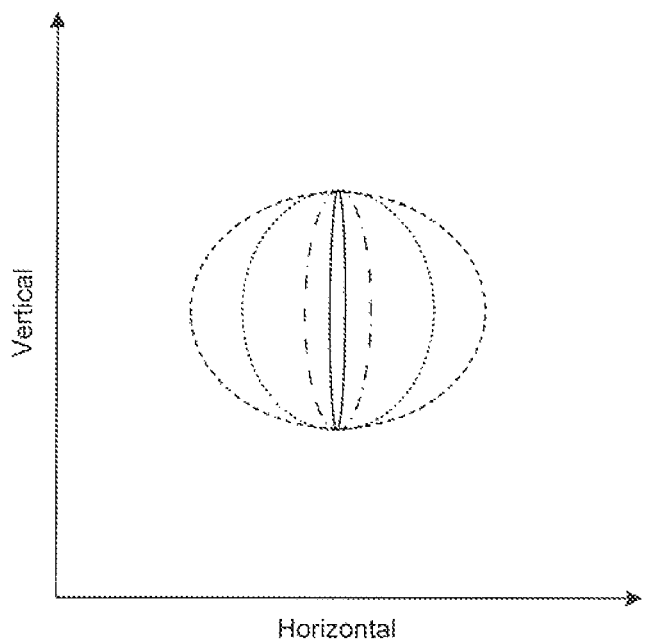
FIG. 5 shows examples of four different cross-sectional views of reflected beams of light associated with the groove patterns shown in FIGS. 4A-4B.

FIG. 5 shows examples of four different cross-sectional views of reflected beams of light associated with each of the groove patterns shown in FIGS. 4A-4B. The incident beams of light used to produce the example cross-sectional views have the same cross-sectional dimensions and strike the four surfaces at the same angle of incidence. The perimeter of each reflected beam cross section is identified by a different line pattern. Dashed-line oval 501 represents a reflected beam with the largest cross section reflected from a screen with the groove pattern shown in FIG. 4A. Dotted-line oval 502 represents a reflected beam with the second largest cross section reflected from a screen with the groove pattern shown in FIG. 4B. Dot-dashed oval 503 represents a reflected beam with the second smallest cross section reflected from a screen with the groove pattern shown in FIG. 4C. Solid-line oval 504 represents a reflected beam with the smallest cross section reflected from a screen with the groove pattern shown in FIG. 4D.

Note that in example plot of FIG. 5, the reflected beam cross sections reveal that the vertical dimension of the reflected beams remains unchanged. In other words, the vertical scattering angle φ is approximately the same for the different viewing surface microstructures. Note that different periods alone do not affect the horizontal scattering angle. The horizontal scattering angle is determined by the ratio A/P and by the groove cross-sectional pattern, such as groove cross section 212. The FIGS. 4 and 5 also reveal that as the ratio A/P decreases, the horizontal scattering angles of the reflected beams also decrease. As a result, the screen 102 can be configured to limit the horizontal scattering angle θ of a reflected image by appropriately selecting the period P and amplitude A of the microstructures. For example, the horizontal scattering angle θ of a louvered microstructured surface with a groove period of about A/P≈1 has a horizontal scattering angle of about 100°, a louvered microstructured surface with A/P≈0.05 has a horizontal scattering angle of about 20°, a microstructured surface with A/P≈0 has a horizontal scattering angle considerable less than 1°.

Control over the horizontal scattering angle θ enables the viewing surface to be configured to simultaneously reflect different images projected onto to the screen 102 to different viewing areas that can only be viewed from within a viewing area. For example, as described in greater detail below with reference to FIG. 6, a first viewer located in a first viewing area is able to view a first image projected onto the screen 102 from a first projector, and a second viewer located in a second viewing area is able to view a second image projected onto the screen 102 from a second projector. However, the first viewer is not able to view the second image from the first viewing area, and the second viewer is not able to view the first image from the second viewing area.

The screen 102 can be configured to operate as a multiview display that presents viewers located in different viewing areas with different two-dimensional views of the same scene, or different scenes, projected onto the screen 102. Multiple two-dimensional views are created when the horizontal scattering angle is greater than zero (i.e., θ>>0). By contrast, perceived three-dimensional perspective views are created when the horizontal scattering angle is approximately zero (i.e., θ≈0°), as described below with reference to FIG. 8. For example, a viewer can be provided with a three-dimensional viewing experience of a scene by displaying different two-dimensional perspective views of the same scene on the screen 102 that can only be viewed from different viewing areas. A multiview viewing experience is created using multiple projectors that each projects a different image onto the screen 102. The microstructured surface 114 of the screen 102 is configured so that the horizontal scattering angle θ is smaller than or approximately equal to the angle of separation between the projectors in order to avoid overlap between adjacent views.

Figure 6:
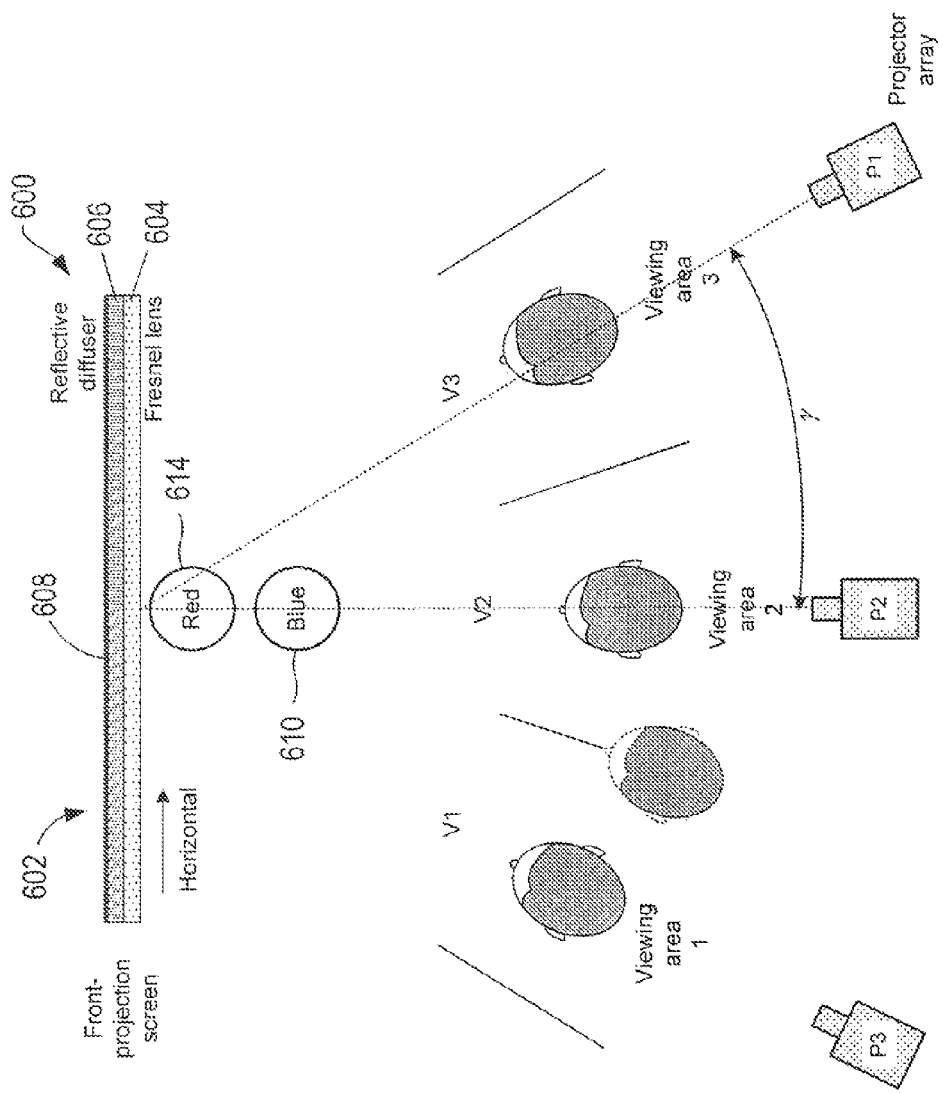
FIG. 6 shows a top view, schematic representation of an example front projection image viewing system.

FIG. 6 shows a top view, schematic representation of an example front projection image viewing system 600. The system 600 includes a screen 602 with a Fresnel lens 604 and a reflective diffuser 606 configured with microstructured surface 608 that provides a multiview viewing experience. The system 600 also includes three projectors identified as P1-P3. In order to create separate viewing areas identified as viewing areas 1-3 that enable a viewer located within a viewing area to see only the projected image from one of the projectors P1-P3, the microstructured surface 608 is configured with a groove pattern that creates a horizontal scattering angle θ that is smaller than or approximately equal to the angle of separation γ between adjacent projectors P1 and P2 and adjacent projectors P2 and P3. For example, three separate viewing areas may be created with the adjacent projectors located about 3 m from the screen 602 and separated by about 30° (γ≈30°), and the microstructured surface 608 configured with a groove pattern to create an approximately 20° horizontal viewing angle θ.

In the example of FIG. 6, the projectors P1-P3 each project one of three different perspective views of a blue ball 610 located in front of a red ball 612 denoted by V1, V2, and V3. The image of the blue and red balls 606 and 608 produced by projector P1 is viewable from viewing area 1, the image of the blue and red balls 606 and 608 produced by projector P2 is viewable from a central viewing area 2, and the image of the blue and red balls 606 and 608 produced by projector P3 is viewable from viewing area 3. In other words, as shown in FIG. 6, an image projected onto the screen 602 from one side of the central viewing area 1 is reflected toward a viewing area located opposite the central viewing area 1. A viewer located in viewing area 1 sees a two-dimensional perspective view V1 of the red ball 608 located to the left of, and partially occluded by, the blue ball 606. A viewer located in viewing area 2 sees a two-dimensional perspective view V2 of the blue ball 606 blocking the view of the red ball 608. A viewer located in viewing area 3 sees a two-dimensional perspective view V3 of the red ball 608 located to the right of, and partially occluded by, the blue ball 606. As shown in FIG. 6, a viewer straddling viewing areas 1 and 2 such that view V1 enters the viewer's left eye and view V2 enters the viewer's right eye may experience binocular rivalry because the perspective views in this example may be considerably different.

Figure 7:
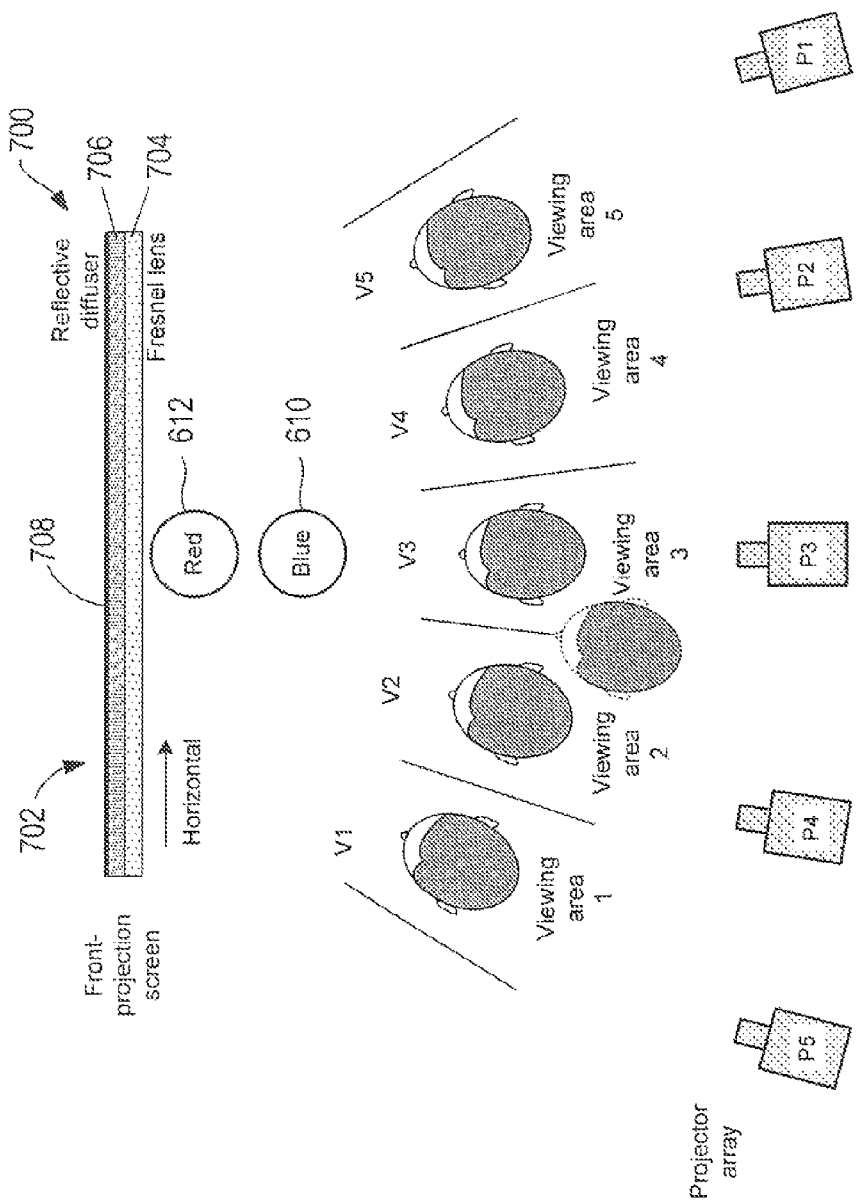
FIG. 7 shows a top view, schematic representation of an example front projection image viewing system.

The number of multiview viewing areas can be increased by increasing the number of projectors that each projects a different image and by appropriately selecting the ratio A/P of the grooves to narrow the horizontal scattering angle θ to produce narrower viewing areas from each projector. FIG. 7 shows a top view, schematic representation of an example front projection image viewing system 700. The system 700 includes a screen 702 with a Fresnel lens 704 and a reflective diffuser 706 configured with a microstructured surface 708 that provides a multiview viewing experience. The system 700 also includes an array of five projectors denoted by P1-P5. In order to create five separate viewing areas that enable a viewer located within a viewing area to see only the projected image from one of the projectors, the microstructured surface 708 is configured with a groove pattern that creates a horizontal scattering angle θ that is less than the angle of separation, γ, between adjacent projectors.

In the example of FIG. 7, the projectors P1-P5 each project a different perspective view of the blue ball 610 located in front of a red ball 612. In the example of FIG. 7, the system 700 is configured to project five different two-dimensional perspective views of the same blue and red balls 610 and 612. The different perspective views are denoted by V1-V5 and correspond to projectors P1-P5, respectively. Each projector Pi projects a different perspective view image Vi of the blue and red balls 610 and 612, where i is a positive integer between 1 and 5. By increasing the number of two-dimensional perspective views, a viewer can move from one viewing area to an adjacent viewing area and see two different perspective views, but without a significant, or abrupt, change in the perspective view. For example, consider a viewer located in viewing area 1, which enables the viewer to see perspective view V1. The perspective view V1 shows the red ball 612 located to the left of, and partially occluded by, the blue ball 610. When the viewer changes position to viewing area 2, the viewer also sees the red ball 612 located to the left of, and partially occluded by, the blue ball 610, but more of the red ball 612 is occluded by the blue ball 610 in perspective view V2 than in perspective view V1. Unlike the three perspective views described above with reference to FIG. 6, the five perspective views V1-V5 enable a viewer to move around in front of the screen 702 and see a near continuum of different two-dimensional perspective views.

FIG. 7 also shows a viewer's head straddling adjacent viewing areas 2 and 3 such that perspective view V2 enters the viewer's left eye and perspective view V3 enters the viewer's right eye. If the two-dimensional perspective views V2 and V3 are similar but slightly different perspective views of the same scene, the perspective views V2 and V3 may be perceived by the viewer as a stereo image pair, enabling the viewer to perceive a three dimensional perspective view image of the blue and red balls. On the other hand, the viewer may experience visual rivalry if the perspective views V2 and V3 are sufficiently different.

Figure 8:
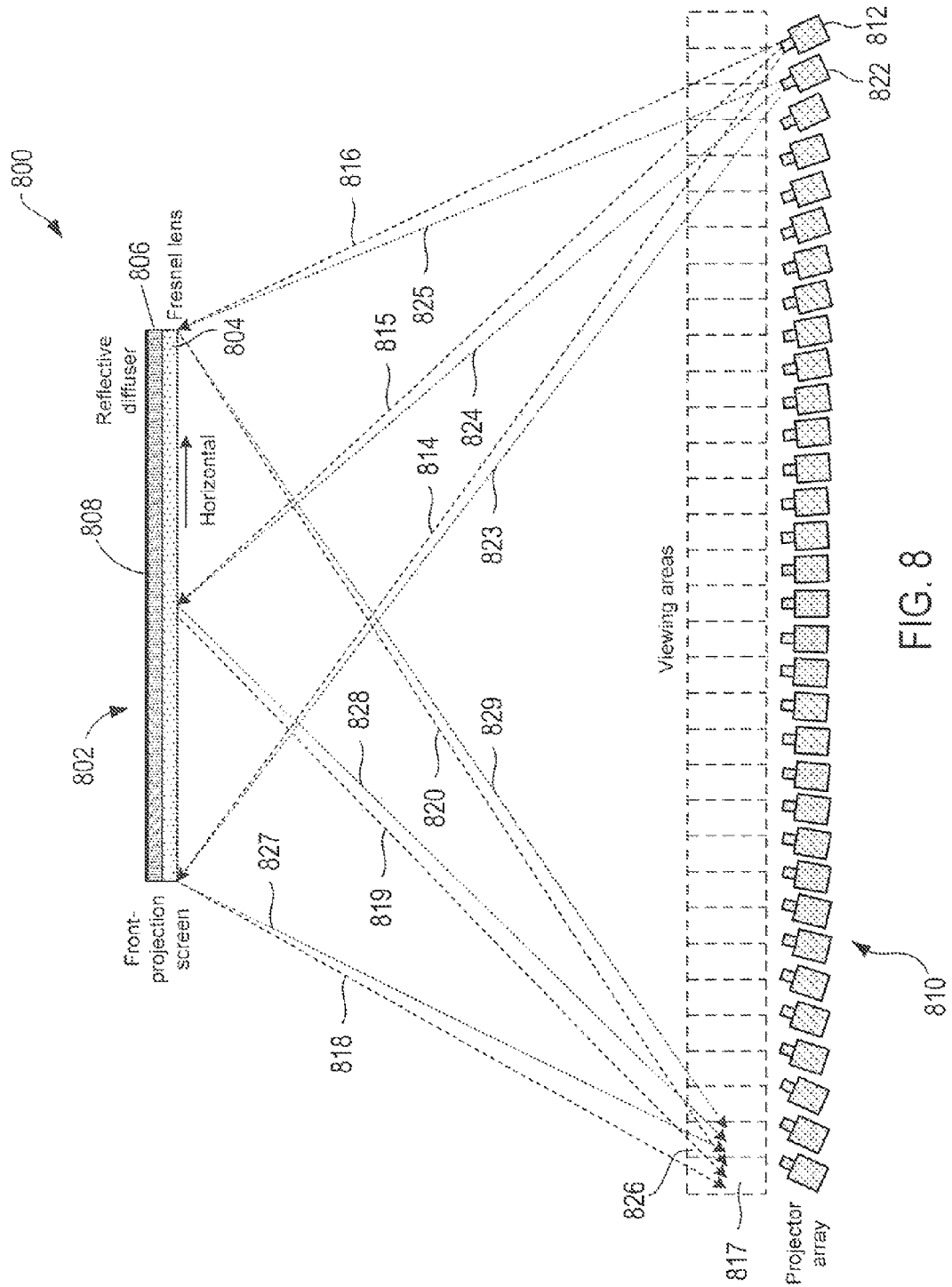
FIG. 8 shows a top view, schematic representation of an example front projection image viewing system.

Further decreasing the horizontal scattering angle of the screen to approximately 0° and increasing the number of two-dimensional perspective views of a scene or motion picture, creates a perceived continuous three-dimensional viewing experience of the scene or motion picture with correct perspective views. FIG. 8 shows a top view, schematic representation of an example front projection image viewing system 800. The system 800 includes a screen 802 with a Fresnel lens 804 and a reflective diffuser 806 configured with a microstructured surface 808 that provides a perceived continuous three-dimensional viewing experience. The system 800 also includes an array of thirty-three projectors 810. The microstructured surface 808 is configured with a groove pattern that creates a horizontal scattering angle θ that is approximately equal to the angle of separation between adjacent projectors (see for example the angle of separate described above with reference to FIG. 6). In particular, the microstructured surface 808 can be configured with grooves that reflect each image with a narrow horizontal scattering angle θ, as described above with reference to FIGS. 4-5. For example, nearly linear closely spaced grooves with the cross-sectional pattern 212 can be used to create a horizontal scattering angle θ that is significantly less the 1° (i.e., <<1°).

Each projector projects a slightly different perspective view image of a scene or motion picture onto the screen 802.

The images projected by each of the projectors onto the screen 802 are reflected back to a viewing area with a narrow horizontal scattering angle creating narrow viewing areas. For example, as shown in FIG. 8A, projector 812 projects a first image outlined by dashed-line directional arrows 814-816 onto the screen 802. The first image is reflected off of the microstructured surface 808 with a narrow horizontal scattering angle and focused into a narrow first viewing area 817, as indicated by dashed-line directional arrows 818-820. Likewise, projector 822 projects a slightly different image with slightly different angle of incidence as outlined by dotted-line directional arrows 823-825. The second image is reflected off of the microstructured surface 808 with a narrow horizontal scattering angle to a narrow second viewing area 826 adjacent to the first viewing area 817, as indicated by dashed-line directional arrows 827-829.

In order to create a perceived continuous three-dimensional viewing experience, each viewing area is narrower than the average distance between two human eye pupils (i.e., less than about 6 cm), so that each perspective view image enters one, but not both, of a viewer's eyes. For example, in practice, at a viewing distance of 2-3 meters, the horizontal scattering angle θ can be smaller than about 0.5° in order to create a perceived three-dimensional viewing experience with continuously varying perspective views without having to wear special viewing glasses or goggles. For example, for a viewer to see imagery on the entire screen 802, an array of several hundred projectors can be used to achieve a field of view of about 100° at viewing distances of up to about 5 meters.

Figure 9:
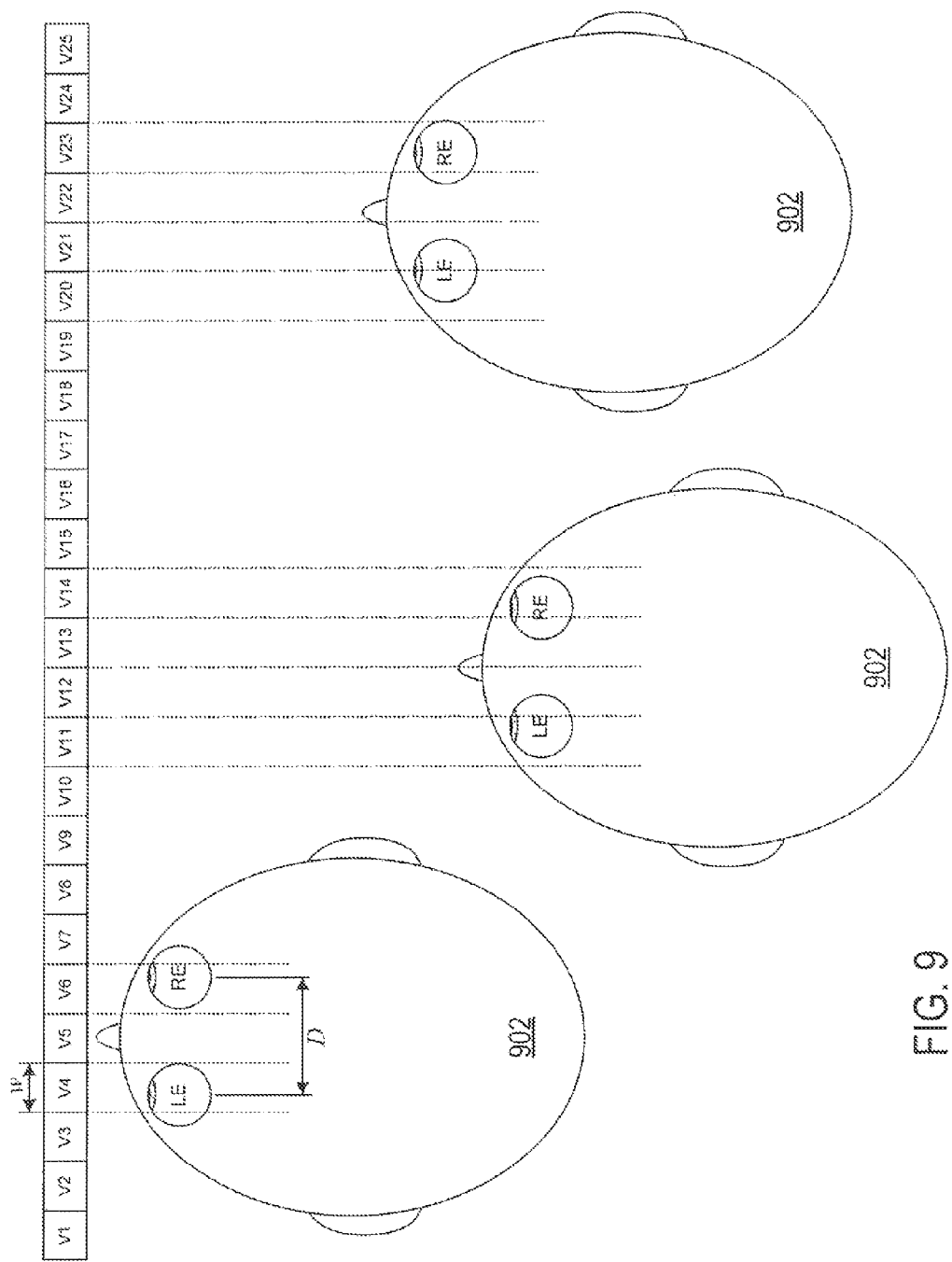
FIG. 9 shows an example array of twenty-five perspective views created by an image viewing system.

FIG. 9 shows an example array of twenty-five perspective views denoted by V1-V25 created by an image viewing system configured to create a perceived continuous three-dimensional viewing experience. Each perspective view is associated with a different viewing area and has a width w that is less than the distance D between a viewer's eyes (i.e., w<D). In the example of FIG. 9, the viewer 902 is positioned so that perspective view V4 enters the viewer's left eye LE and perspective view V6 enters the viewer's right eye RE. Even though the perspective views V4 and V6 are separated by perspective view V5, the perspective views V4, V5, and V6 are slightly different. As a result, the perspective views V4 and V6 are sufficient to operate as a stereo image pair that enables the viewer 902 to perceive a perspective-correct three dimensional view of the scene or motion picture presented on the viewing system screen. In FIG. 9, the viewer 902 also changes position so that perspective view V11 enters the viewer's left eye LE and perspective view V14 enters the viewer's right eye RE. Even though the perspective views V11 and V14 are separated by two perspective views V12 and V13, the perspective views V11-V14 are slightly different. As a result, the perspective views V11 and V14 are sufficient to operate as a stereo image pair that enables the viewer 902 to perceive a perspective-correct three dimensional view of the image presented on the viewing system screen. FIG. 9 also shows the viewer's LE straddling two different perspective views. Adjacent perspective views V20 and V21 both enter the viewer's left eye LE and perspective view V23 enters the viewer's right eye RE. Adjacent perspective views V20 and V21 overlap to a great extent. As a result, the viewer's brain averages the two adjacent views to produce a two-dimension perspective view that in combination with the perspective view V23 form a stereo image pair.

Figure 10:
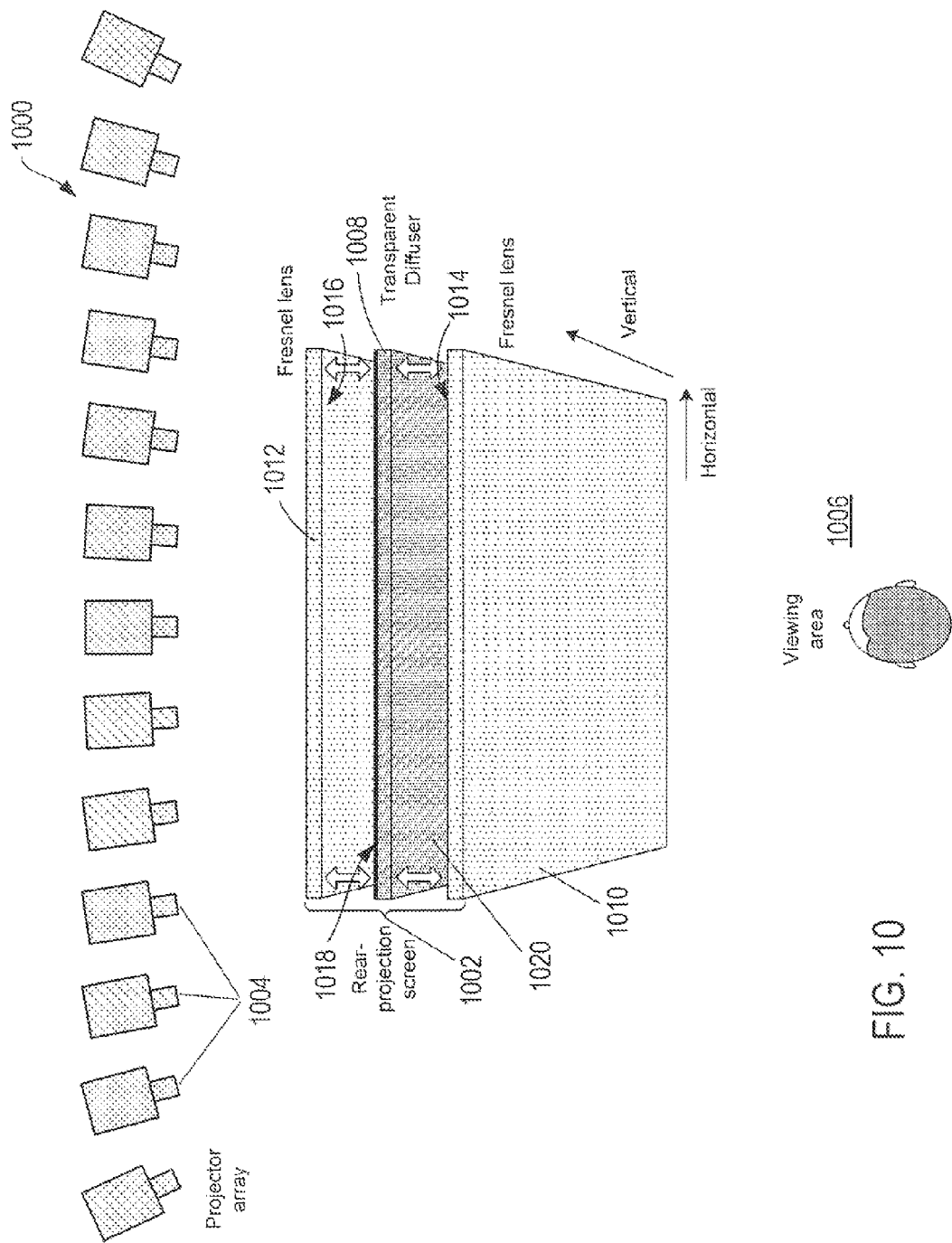
FIG. 10 shows a top perspective view, schematic representation of an example rear projection image viewing system.

FIG. 10 shows a bird's-eye perspective view of an example rear projection image viewing system 1000. The system 1000 includes a rear projection screen 1002 and an array of projectors 1004 located behind the screen 1002 and opposite a viewing area 1006. Each projector 1004 is positioned to project an image onto the screen 1002 that can be viewed by looking at the screen 1002 from the viewing area 1006. FIG. 10 shows an exploded isometric view of the screen 1002 that reveals the screen 1002 includes a transparent microstructured layer 1008 disposed between a first lens 1010 and a second lens 1012. The lenses 1010 and 1012 can be Fresnel lenses, and the layer 1008 and lenses 1010 and 1012 can be composed of glass, polycarbonate, or another suitable transparent material. The lenses 1010 and 1012 include surfaces 1014 and 1016, respectively, each of which is configured with a series of concentric annular louvered grooves (not shown) that enable the lenses 1010 and 1012 to operate as large convex lenses. Alternatively, the lens 1010 and 1012 can be configured with a series of parallel louvered grooves in the vertical direction to form a convex cylindrical lens that focuses light in the horizontal direction. The layer 1008 includes a microstructure pattern on at least one of the surfaces 1018 and 1020. In certain examples, the screen 1002 is arranged so that the grooves of the surface 1014 face the surface 1020 and the microstructured surface 1018 faces the second lens 1010, and the grooves of the surface 1016 face the microstructured surface 1018.

Figure 11A:
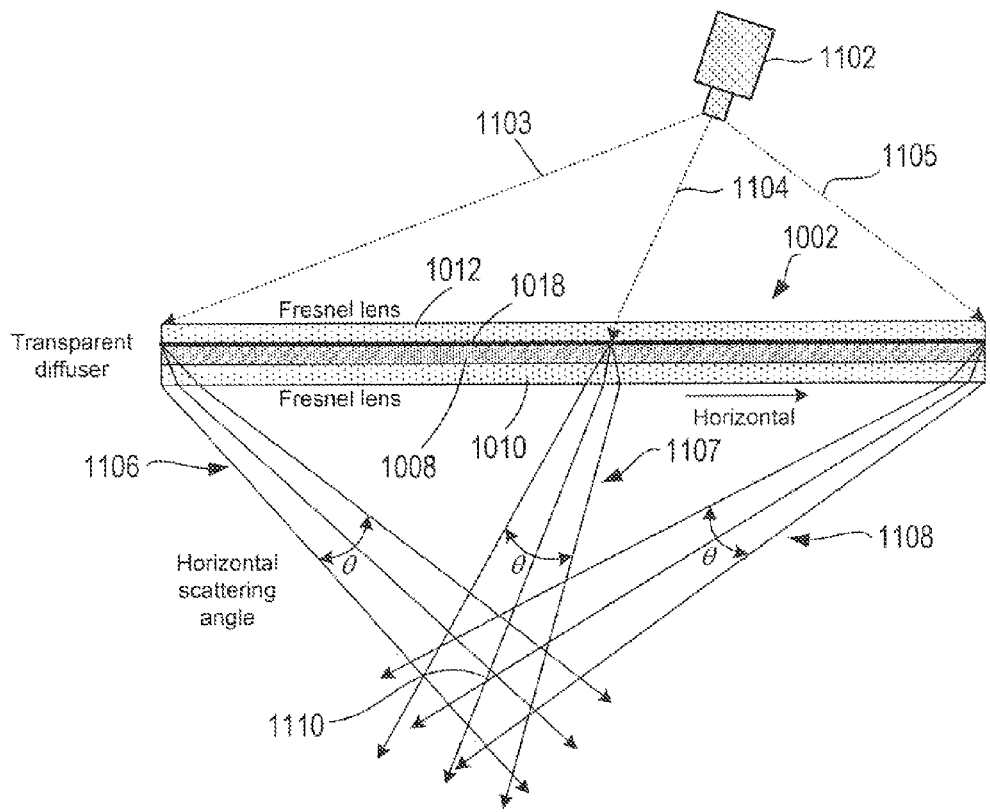
FIGS. 11A-11B show top and side views, respectively, of an example rear projection screen and a projector of a rear projection image viewing system.
Figure 11B:
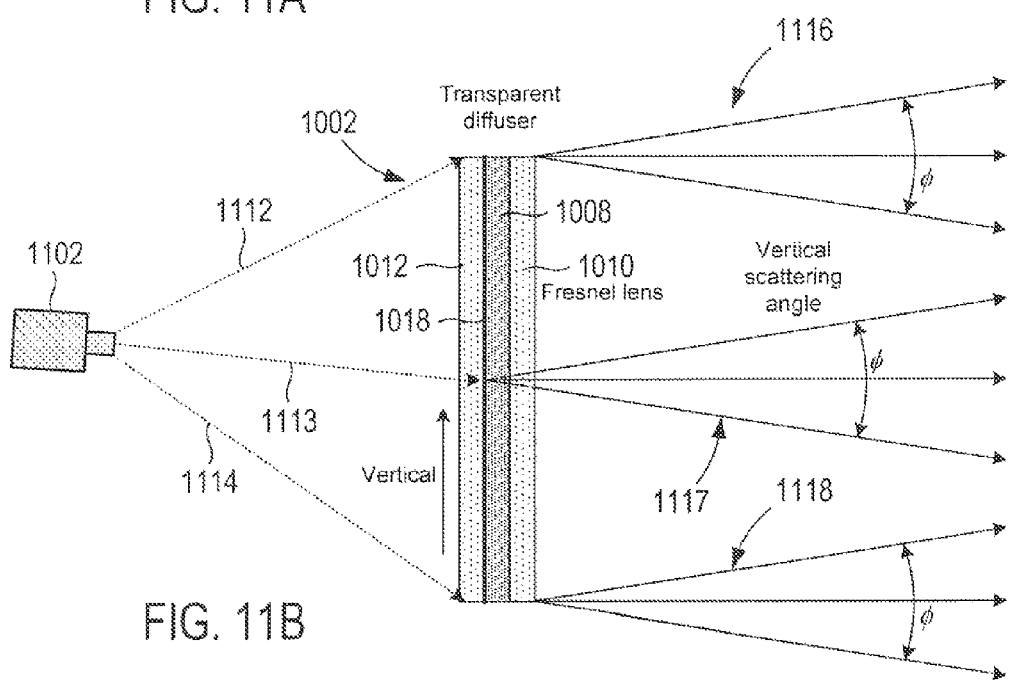

The microstructured surface 1018 can be patterned with grooves as described above with reference to FIG. 2, where the ratio of A/P and the groove cross-sectional pattern determine how light is scattered as the light is transmitted through the screen 1002. In FIGS. 11A-11B, the projector 1102 projects light represented by incident rays 1103-1105 onto to the screen 1002. The light is refracted upon entering the screen 1002 by the second lens 1012, reflected from the microstructured surface 1118, and is focused by the first lens 1010 to a viewing area 1110. Rays 1106-1108 represent how light through the diffuser 1008 is directed to the viewing area 1110 by the screen 1002 and scattered by the microstructured surface 1018 with a horizontal scattering angle θ. The width of the viewing area 1110 increases as the viewing distance from the screen 1002 increases. In FIG. 11B, incident rays 1112-1114 are scattered by the microstructured surface 1018 with a vertical scattering angle φ, as represented by transmitted rays 1116-1118, when a cylindrical lens is used for the lenses 1010 and 1012. The larger the horizontal scattering angle θ the more diffused the reflected beam of light appears in the horizontal direction 1106. Likewise, the larger the vertical scattering angle φ the more diffuse the reflected beam of light appears in the vertical direction 1108. The vertical and horizontal scattering angles are independent and determined by the ratio A/P and the groove cross-sectional pattern, which can be selected to control the horizontal scattering angle of transmitted light in the same manner that the horizontal scattering angle of light reflected from the microstructured surface 114 is controlled, as described above with reference to FIGS. 4 and 5.

The microstructured surface 1018 can be configured to simultaneously transmit different images projected onto the screen 1002 to different viewing areas on the opposite side of the screen that can only be viewed from within a viewing area. For example, as described in greater detail above with reference to FIG. 3, a first viewer located in a first viewing area is able to view a first image projected onto the screen 1002 from a first projector located behind the screen 1002, and a second viewer located in a second viewing area is able to view a second image projected onto the screen 102 from a second projector located behind the screen 1002. However, the first viewer is not able to view the second image from the first viewing area, and the second viewer is not able to view the first image from the second viewing area.

The screen 1002 can be configured to operate as a multiview display that presents viewers located in different viewing areas with different two-dimensional views of the same scene, or different scenes, projected onto the screen 1002. A multiview viewing experience is created using multiple projectors that each projects a different image onto the screen 1002. The microstructured surface 1018 of the screen 102 is configured so that the horizontal scattering angle θ of the transmitted light is about equal or the angle of separation between the projectors in order to avoid significant overlap between adjacent views that causes cross talk between the adjacent views.

Figure 12:
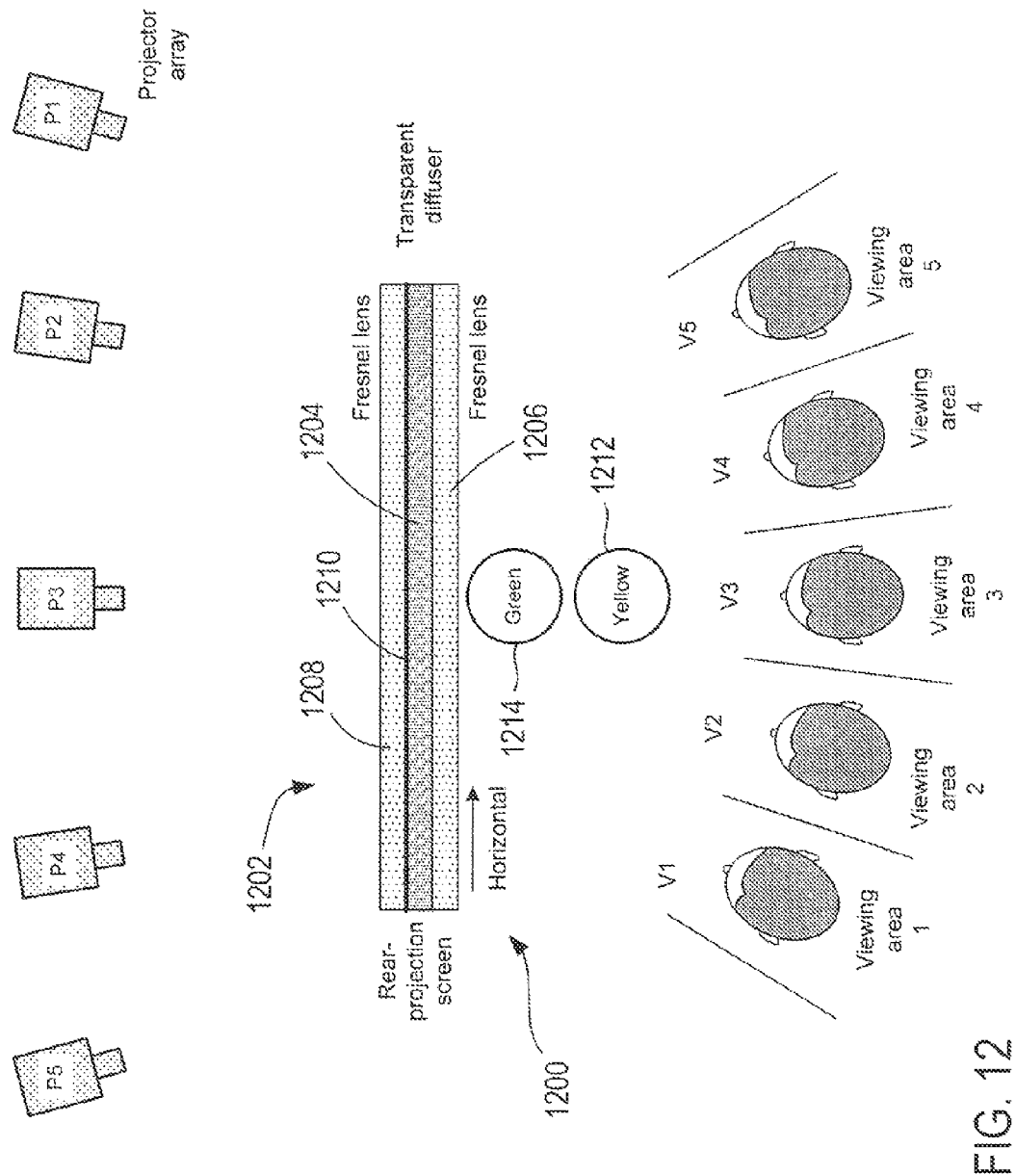
FIG. 12 shows a top view, schematic representation of an example rear projection image viewing system.

FIG. 12 shows a top view, schematic representation of an example rear projection image viewing system 1200. The system 1200 includes a rear projection screen 1202 and an array of projectors P1-P5 located behind the screen 1202 and opposite a viewing area. The screen 1202 includes a transparent microstructured layer 1204 disposed between a first Fresnel lens 1206 and a second Fresnel lens 1208. The layer 1204 includes a microstructured surface 1210. Each projector is positioned to project an image onto the screen 1202 that can only be viewed from one viewing area. In order to create five separate viewing areas that enable a viewer located within a viewing area to see only the projected image from one of the projectors, the microstructured surface 1210 is configured with a groove pattern that creates a horizontal scattering angle θ that is approximately equal the angle of separation between adjacent projectors, as described above with reference to FIG. 6.

In the example of FIG. 12, the projectors P1-P5 each project a different perspective view of the yellow ball 1212 located in front of a green ball 1214. In the example of FIG. 12, the system 1200 is configured to project five different two-dimensional perspective views of the yellow and green balls. The different perspective views are denoted by V1-V5 and correspond to projectors P1-P5, respectively. Each projector Pi projects a different perspective view image Vi, where i is a positive integer between 1 and 5. A viewer can move from one viewing area to an adjacent viewing area and see two different perspective views. For example, consider a viewer located in viewing area 5, which enables the viewer to see perspective view V5. The perspective view V5 shows the green ball 1214 located to the right of, and partially occluded by, the yellow ball 1212. When the viewer changes position to viewing area 4, the viewer also sees the green ball 1214 locate to the right of, and partially occluded by, the yellow ball 1212, but more of the green ball 1214 is occluded by the yellow ball 1212 in perspective view V4 than in perspective view V5. In other words, the five different perspective views V1-V5 enable a viewer to move around in front of the screen 1202 and see a near continuum of different two-dimensional perspective views.

Figure 13:
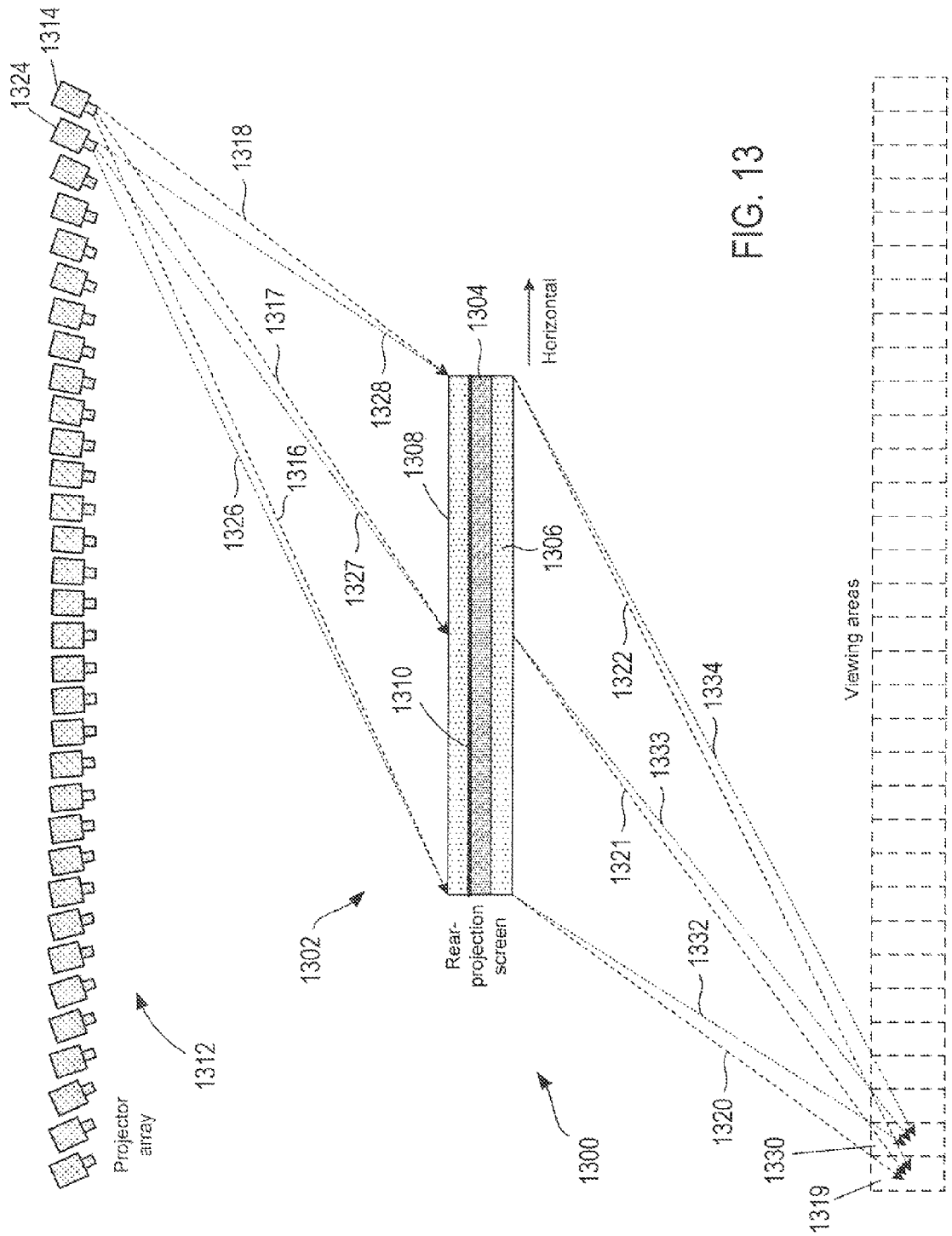
FIG. 13 shows a top view, schematic representation of an example rear projection image viewing system.

Further decreasing the horizontal scattering angle of the screen and increasing the number of two-dimensional perspective views of a scene or motion picture, creates a perceived continuous three-dimensional viewing experience of the scene or motion picture with correct perspective views. FIG. 13 shows a top view, schematic representation of an example rear projection image viewing system 1300. The system 1300 includes a screen 1302 composed of a transparent microstructured layer 1304 disposed between a first Fresnel lens 1306 and a second Fresnel lens 1308. The layer 1304 includes a diffuser 1304 with microstructured surface 1310. The system 1300 also includes an array of thirty-three projectors 1312. The microstructured surface 1310 is configured with a groove pattern that creates a horizontal scattering angle θ that is approximately equal to the angle of separation between adjacent projectors. In particular, the microstructured surface 1310 can be configured with the ratio A/P≈0 and a groove cross-sectional pattern 212, shown in FIG. 2, in order to transmit each image into a viewing area with a narrow horizontal scattering angle θ significantly less the 1° (i.e., <<1°).

Each projector projects a slightly different perspective view image of a scene or motion picture onto the second Fresnel lens 1308 of the screen 1302. The images projected by each of the projectors onto the screen 1302 are transmitted through the screen to a viewing area with narrow horizontal scattering angles creating narrow adjacent viewing areas. For example, as shown in FIG. 13, projector 1314 projects a first image outlined by dashed-line directional arrows 1316-1318 onto the screen 1302. The first image is transmitted through the microstructured surface 1310 with a narrow horizontal scattering angle and focused into a narrow first viewing area 1319, as indicated by dashed-line directional arrows 1320-1322. Likewise, projector 1324 projects a slightly different image outlined by dotted-line directional arrows 1326-1328. The second image is transmitted through the screen 1302 with a narrow horizontal scattering angle to a narrow second viewing area 1330 adjacent to the first viewing area 1319, as indicated by dashed-line directional arrows 1332-1334.

In order to create a perceived continuous three-dimensional viewing experience, each viewing area can be narrower than the average distance between two human eye pupils so that each perspective view image enters one, but not both, of a viewer's eyes. As a result, the system 1300 can be used to create a perceived three-dimensional viewing experience, as described above with reference to FIG. 9.

Like the front projection screen 802 described above, in practice, at a viewing distance of about 2 to about 5 meters, the horizontal scattering angle θ is less than about 0.5° in order to create a perceived continuous three-dimensional viewing experience. Also, for a viewer to see imagery on the entire screen 1302, an array of a few hundred projectors can be used to achieve a field of view of about 100°.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the following claims and their equivalents:

The invention claimed is:

1. An image viewing system comprising:
   a screen including a reflective diffuser with a microstructured surface to provide diffuse reflection in a specular scattering direction and an integrated lens to image an extent of the reflective diffuser into the specular scattering direction, the microstructured surface comprising grooves defined by one or more sinusoidal wave patterns, the grooves extending in a horizontal direction across the screen and exhibiting sinusoidal undulations that are oriented in a vertical direction and are coplanar with the microstructured surface; and an array of projectors, wherein each projector is positioned to project an image onto the screen with a particular angle of incidence such that each image is to pass through the integrated lens and is to be reflected back though the integrated lens by the reflective diffuser with a horizontal scattering angle determined by the microstructured surface, wherein the integrated lens is to direct each reflected image to a particular viewing area in the specular scattering direction with a size of the reflected image being defined by the horizontal scattering angle so that a viewer located in at least one viewing area receives a reflected image that is to enter one or both of the viewer's eyes when the viewer looks at the screen.

2. The system of claim 1, wherein the integrated lens comprises a flat lens with louvered grooves oriented to face the reflective diffuser.

3. The system of claim 1, wherein the reflective diffuser further comprises a reflective material with the microstructured surface oriented to face the integrated lens.

4. The system of claim 1, wherein the reflective diffuser further comprises a transparent material having a first surface opposite a second surface the first surface comprising the integrated lens and the second surface being coated with a reflective material and comprising the microstructured surface.

5. The system of claim 1, wherein the screen comprises a single piece of transparent material with a first surface that faces the viewing area patterned to operate as the integrated lens and a second opposing surface that is the microstructured surface coated with a reflective material.

6. The system of claim 1, wherein the sinusoidal wave patterns of the grooves comprise a period and an amplitude that determine the horizontal scattering angle of light to be reflected from the viewing surface.

7. The system of claim 1, wherein the array or projectors further comprise each pair of projectors project images onto the screen with an angle of separation that is greater than the horizontal scattering angle of light to be reflected from the screen.

8. The system of claim 1, wherein each different image further comprises a two-dimensional perspective view image of a scene or motion picture such that when the viewer looks at the viewing surface from within a viewing area a perspective view of the scene or motion picture is to enter both of the viewer's eyes.

9. The system of claim 1, wherein the screen is to reflect each image to a different viewing area with a horizontal dimension that is less than the average distance between a viewer's eyes.

10. The system of claim 1, wherein each projector is to project a different perspective view image of a scene or motion picture onto the screen and the screen is to reflect each perspective view such that a first perspective view is to enter the viewer's left eye and a second perspective view is to enter the viewer's right eye to form a stereo image pair to provide the viewer with a three-dimensional, perspective view of the scene or motion picture.

11. An image viewing system comprising:
a screen including a transparent diffuser layer with a microstructured surface disposed between a first lens and a second lens, the microstructured surface comprising grooves defined by one or more sinusoidal wave patterns, the grooves extending in a horizontal direction across the screen and exhibiting sinusoidal undulations that are oriented in a vertical direction and are coplanar with the microstructured surface; and
an array of projectors, wherein each projector is positioned to project an image onto the screen with a particular angle of incidence such that each image is to be transmitted through the second lens and the transparent layer with a horizontal scattering angle determined by the microstructured surface, and wherein the first lens and the second lens are to direct each transmitted image to a particular viewing area with a size of the transmitted image being defined by the horizontal scattering angle so that a viewer located in at least one viewing area receives a transmitted image that is to enter one or both of the viewer's eyes when the viewer looks at the screen.

12. The system of claim 11, wherein the first lens and the second lens further comprise flat lenses, each with louvered grooves oriented to face the transparent layer.

13. The system of claim 11, wherein the transparent diffuser layer further comprises a transparent material with the microstructured surface oriented opposite one of the first lens and the second lens.

14. The system of claim 11, wherein the sinusoidal wave patterns of the grooves comprise a period and an amplitude that determine the horizontal scattering angle of light to be transmitted through the screen.

15. The system of claim 11, wherein the array or projectors further comprise each pair of projectors project images onto the screen with an angle of separation that is greater than the horizontal scattering angle of light to be transmitted through the screen.

16. The system of claim 11, wherein each different image further comprises a two-dimensional perspective view image of a scene or motion picture such that when the viewer looks at the viewing surface from within a viewing area a perspective view of the scene or motion picture is to enter both of the viewer's eyes.

17. The system of claim 11, wherein the screen is to transmit each image to a different viewing area with a horizontal dimension that is less than the average distance between a viewer's eyes.

18. The system of claim 11, wherein each projector is to project a different perspective view image of a scene or motion picture onto the screen and the screen is to transmit each perspective view such that a first perspective view is to enter the viewer's left eye and a second perspective view is to enter the viewer's right eye to form a stereo image pair to provide the viewer with a three-dimensional, perspective view of the scene or motion picture.

* * * * *

UNITED STATES PATENT AND TRADEMARK OFFICE
CERTIFICATE OF CORRECTION

PATENT NO. : 8,459,797 B2
APPLICATION NO. : 12/917387
DATED : June 11, 2013
INVENTOR(S) : Huei Pei Kuo et al.

It is certified that error appears in the above-identified patent and that said Letters Patent is hereby corrected as shown below:

In the Claims

In column 11, line 5, in Claim 1, delete "though" and insert -- through --, therefor.

In column 11, line 22, in Claim 4, delete "surface" and insert -- surface, --, therefor.

Signed and Sealed this
Nineteenth Day of November, 2013

Teresa Stanek Rea
*Deputy Director of the United States Patent and Trademark Office*